United States Patent
Vesuna

(10) Patent No.: US 6,188,681 B1
(45) Date of Patent: Feb. 13, 2001

(54) METHOD AND APPARATUS FOR DETERMINING ALTERNATIVE SECOND STATIONARY ACCESS POINT IN RESPONSE TO DETECTING IMPEDED WIRELESS CONNECTION

(75) Inventor: Sarosh N. Vesuna, Los Altos, CA (US)

(73) Assignee: Symbol Technologies, Inc., Holtsville, NY (US)

(*) Notice: Under 35 U.S.C. 154(b), the term of this patent shall be extended for 0 days.

(21) Appl. No.: 09/053,072

(22) Filed: Apr. 1, 1998

(51) Int. Cl.$^7$ ................. H04Q 7/24; H04Q 7/00
(52) U.S. Cl. ............ 370/338; 370/332; 455/436
(58) Field of Search .................. 370/230, 216, 370/217, 221, 328–9, 331–33, 338, 400–402, 428, 225; 455/517, 67.3, 466, 436, 437–9

(56) References Cited

U.S. PATENT DOCUMENTS

| | | |
|---|---|---|
| 5,029,183 | 7/1991 | Tymes . |
| 5,583,866 * | 12/1996 | Vook et al. ................. 370/312 |
| 5,594,731 * | 1/1997 | Reissner .................... 370/338 |
| 5,654,959 * | 8/1997 | Baker et al. ............... 370/331 |
| 5,657,317 | 8/1997 | Mahany et al. . |
| 5,668,803 | 9/1997 | Tymes et al. . |
| 5,987,011 * | 11/1999 | Toh ............................ 370/331 |
| 5,987,062 * | 11/1999 | Engwer et al. ............ 375/225 |

OTHER PUBLICATIONS

Local and Metropolitan Area Networks, IEEE Standard for Wireless LAN Medium Access Control (MAC) and Physical Layer (PHY) specifications, IEEE Std. 802.11–1997, pp. 34–59 and pp. 123–128.

\* cited by examiner

*Primary Examiner*—David R. Vincent
(74) *Attorney, Agent, or Firm*—Finnegan, Henderson, Farabow, Garrett & Dunner, L.L.P.

(57) ABSTRACT

When a connection between a remote unit (MU) and a first stationary access point (SAP) in a wireless network is impeded, an alternative connection between the MU and a second stationary access point is set up using information from announcement messages. The announcement messages are transmitted to notify MUs about messages waiting to be transferred, but the MU looking for an alternative to the impeded connection uses the announcement message to determine other stationary access points it may communicate with. This eliminates congestion normally caused by the MU performing dedicated probing to determine alternative stationary access points. Probing messages and probing response messages often cause congestion in a network.

26 Claims, 2 Drawing Sheets

METHOD AND APPARATUS FOR DETERMINING ALTERNATIVE SECOND STATIONARY ACCESS POINT IN RESPONSE TO DETECTING IMPEDED WIRELESS CONNECTION

BACKGROUND OF THE INVENTION

The invention relates to data communication systems, and more particularly to a wireless local area network (LAN) communication system in which a number of remote units associate with stationary access points in a manner that reduces traffic on the LAN.

A wireless LAN is implemented by integrating wireless communication with wired communication. Typically, wireless mobile units (MUs) send messages to and receive messages from Stationary Access Points (SAPs). Each SAP covers a particular geographical area. The network may be extended by connecting each SAP to a host that coordinates message traffic between SAPs.

The IEEEE 802.11 standard is part of a family of standards that define physical and data link layers for wireless local and metropolitan networks. IEEE 802.11 is the standard that defines the wireless LAN medium access control (MAC) and physical layer (PHY) specifications. More particularly, the IEEE 802.11 standard provides MAC and PHY specifications for fixed, portable, and moving mobile units within a local area.

The standard covers both portable and mobile remote units in a wireless LAN environment. A portable remote unit is only used from a fixed location, whereas a mobile remote unit access the LAN while in motion.

Under the standard, the mobile and portable MUs communicate with SAPs using wireless communication. The SAPs may communicate with each other directly, or through one or more host systems. The combination of remote units, stationary access points, and hosts form a network.

As mobile and portable MUs (mobile units) move, SAPs receive and transfer messages from and to the MUs. Each SAP covers a geographical area in which units may communicate with it. In the 802.11 standard, connections between units and stationary access points are handled by a set of Association services.

For a message to be transmitted, an MU must become associated with a SAP. A distribution service on the local area network uses these MU-SAP mappings to transmit messages between the MUs. At any point in time, an MU can be associated with only one SAP. A single SAP can be associated with multiple MUs.

"Association" refers to the process of synchronizing an MU with an SAP for communication, and is initiated by the MU. The MU first determines which SAPs are present, and then requests association with a particular SAP. To determine which SAPs are present, the MU carries out a process called "scanning."

MU scanning can be passive or active. Passive scanning in the IEEE 802.11 standard is performed by MUs monitoring beacon frames sent out by SAPs. Beacon frames are used in the standard to synchronize to the SAPs, and MUs look for these frames to determine which SAPs are close enough to communicate with.

In active scanning, an MU transmits probe frames. All SAPs which can hear this MU receive the probe frames and return probe response frames if certain criteria regarding the probe frame are met.

When a connection with an SAP is impeded, such as by SAP failure, MUs in the geographical region serviced by the failed SAP sends out probe frames to find a new SAP to handle communications. Therefore, there is a spike in the number of probe frames when connection to multiple MUs is impeded, such as when an SAP fails. There is also a spike in the number of probe response frames. This causes the system to be flooded with probe frames and probe response frames, and the system becomes congested. Congestion results in lost communication because the system cannot handle the traffic.

U.S. Pat. No. 5,657,317 to Mahany et al. describes a system for detecting loss of connection, and reconnecting to a different stationary access point. None of the described approaches discussed, however, provide a solution to the problem of eliminating probe frame congestion.

What is needed, then, is a system and method for eliminating probe frames when connection between an SAP and MU is impeded.

SUMMARY OF THE INVENTION

In accordance with one embodiment of the invention, the invention comprises a method and apparatus for establishing communication and association between a first remote unit and a first access point; determining, in said first remote unit, that communication between the first remote unit and the first access point has been impeded; receiving in said first remote unit announcement messages broadcast over the airwaves, each message having an identification of particular ones set in the traffic indication map (TIM) field of the broadcast of said remote units that have data messages waiting for transmission to said particular ones of said remote units; determining, in said first remote unit, the identity of the access point sending the announcement message; and sending from a said remote unit a message including a request that said remote unit Associate with the access point determined to be sending the announcement message.

Determining the source of an announcement message allows an MU to determine which SAPs are possible candidates for connection when a connection to a first SAP is impeded. By using announcement message information, the MU does not use probe messages, which also eliminates the probe response messages. Eliminating probe and probe response messages reduces congestion in the network when connection between an SAP and multiple MUs is impeded.

BRIEF DESCRIPTION OF THE DRAWINGS

The features believed characteristic of the invention are set forth in the appended claims. The invention itself, however, as well as other features and advantages thereof, may best be understood by reference to the detailed description of a specific embodiment which follows, when read in conjunction with the accompanying drawings, wherein:

DETAILED DESCRIPTION OF A SPECIFIC EMBODIMENT

The present invention allows an MU to establish connection with a second SAP when a connection with a first SAP is impeded, without using probe and probe response messages. An MU connected with the first stationary access point detects that the connection is impeded, and in response begins analyzing announcement messages to determine the source of the messages. By determining the source of messages being received, the MU can determine an alternative SAP to connect to for transmitting messages.

Figure 1:
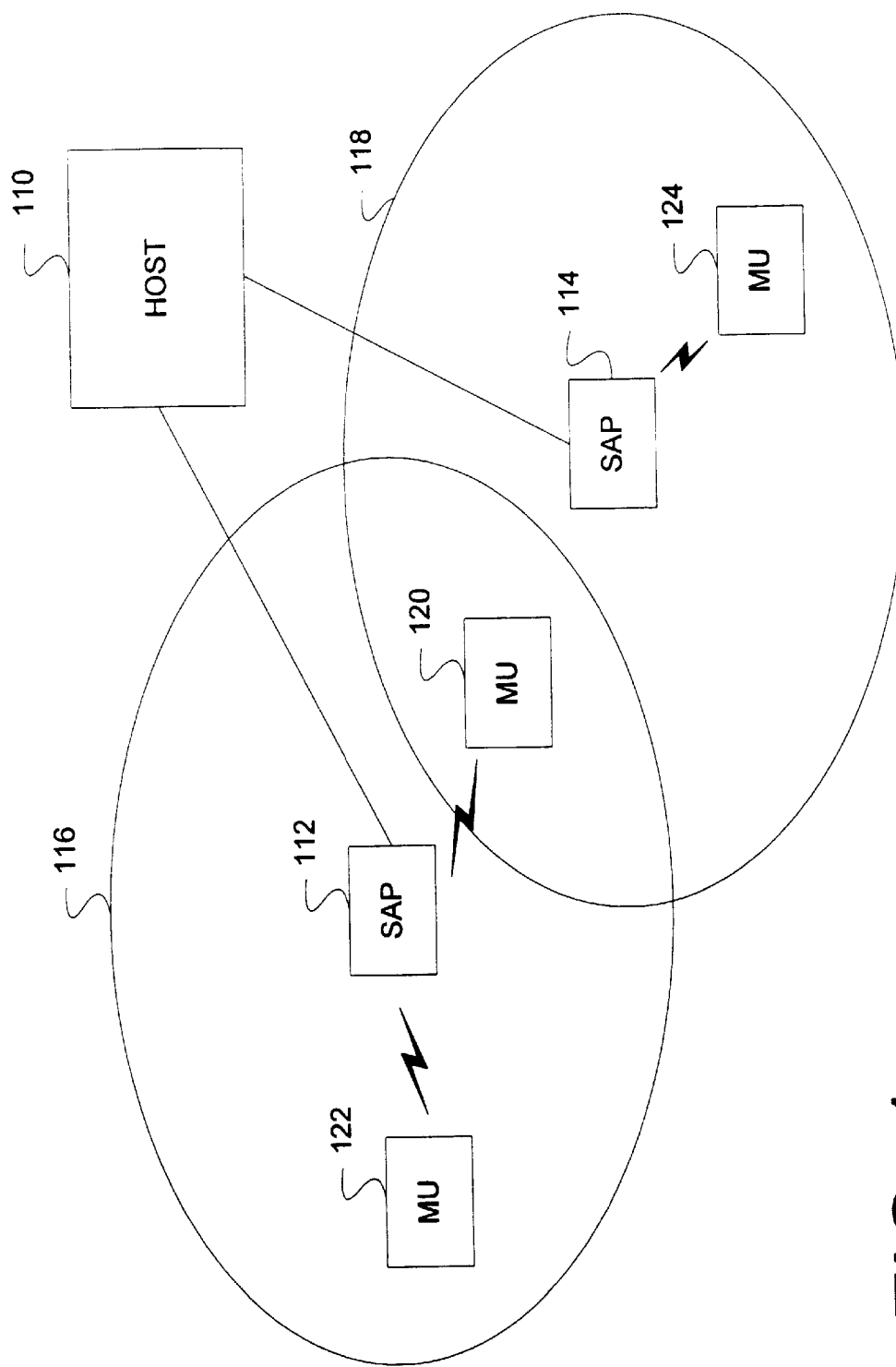
FIG. 1 is a block diagram showing an overview of a network.

FIG. 1 is a block diagram showing a wireless network architecture. Host 110 is connected to SAP 112 and SAP 114. SAP 112 handles wireless communications within geographical area 116, and SAP 114 handles communications within geographical area 118. Therefore, SAP 112 may communicate with MU 120 and MU 122, and SAP 114 may communicate with MU 120 and MU 124.

It is possible for MU 120 to communicate with either SAP 112 or SAP 114, although MU 120 preferably only communicates with one of them at a time. Each MU only communicates with one SAP at a time.

In one scenario, MU 120 associates with an SAP, for example SAP 112, and thereafter communicates with SAP 112 to transmit messages to other MUs. If MU 120 has associated with SAP 112, MU 120 could transmit a message to MU 122 via SAP 112, or to MU 124 via SAP 112, host 110 and SAP 114.

A problem arises when the connection between SAP 112, MU 122 and MU 120 is impeded, such as when SAP 112 fails. At that time, MU 120 and MU 122 normally begin sending out probe messages to find another SAP to associate with, and probe response messages are returned. The probe messages and probe response messages cause congestion in the network as discussed above.

The method and apparatus consistent with the principles of the present invention avoid this congestion by not using probe and probe response messages in response to an MU-SAP connection becoming impeded. Rather, the present invention uses existing information being sent by SAPs to determine likely SAP candidates for association. By using information already being sent by SAPs, the present invention avoids the active probing performed by each MU in response to failure of an SAP.

SAP 112 and SAP 114 periodically send out announcement messages indicating that host 110 has messages for one or more MUs. The announcement message includes a source field identifying the source of the message. For example, announcement messages sent by SAP 114 will include an identification of SAP 114. During the time MU 120 is associated with SAP 112, MU 120 is also receiving announcement messages from SAP 114 because MU 120 is in geographical zone 118 covered by SAP 114.

Therefore, if SAP 112 fails, MU 120 analyzes announcement messages being received from SAP 114 to determine potential SAP candidates, in this case SAP 114, for communication. By using the announcement messages to determine SAP candidates, the system avoids the use of probe and probe response messages, and avoids congestion.

SAP 112, SAP 114, and host 110 may be implemented by hardware and software. Similarly, MU 122, MU 120 and MU 124 may be implemented as programmable processor-based units executing software modules. One embodiment of the process performed by the software modules is described below. In one embodiment, MUs 120, 122 and 124 are hand-held data-gathering units. The elements of FIG. 1 may operate, for example, in accordance with the IEEE 802.11 standard, with the exception of the MUs. The MUs, in accordance with the principles of the present invention, do not use probe and probe response messages.

The contents of U.S. Pat. No. 5,029,183 to Tymes, and U.S. Pat. No. 5,668,803 to Tymes et al., both assigned to Symbol Technologies, are hereby incorporated by reference. These patents show systems in which methods and apparatus consistent with the principles of the present invention may be practiced. Each patent describes a system in which hand-held data-gathering MUs communicate via wireless link with SAPs, similar to the system shown in FIG. 1.

FIG. 1 is representative of a system in which the present invention may be used. In practice, each geographical area 116 and 118 may include multiple MUs, and other SAPs and hosts may be interconnected to form multiple networks. Host 110 may also be connected to another network.

Figure 2:
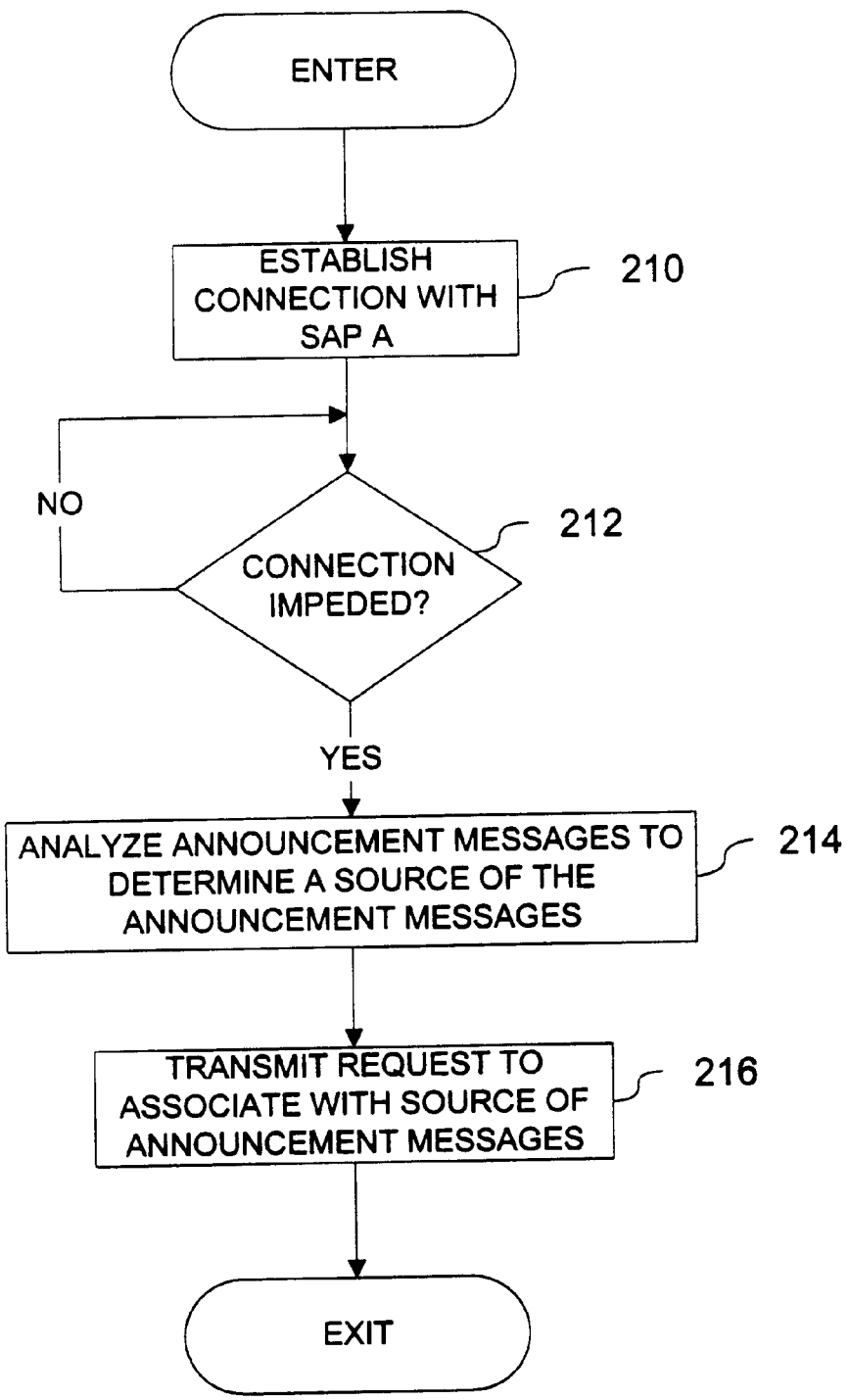
FIG. 2 is a flow chart showing the operation of a remote unit when transmission between the remote unit and a stationary access point has been impeded.

FIG. 2 is a flow chart showing the operation of a remote unit finding an alternative SAP to associate with upon detecting that the current connection with an SAP is impeded. The MU first establishes connection with a first SAP (step 210). If the MU determines that the connection with the SAP is impeded (step 212), it analyzes announcement messages to determine the source of the message (step 214). An impeded connection may be detected by well-known methods for detecting that a connection is impeded, such as by total loss of the connection, or severe degradation of the connection. For example, an impeded connection may be detected by situations which lead to probing in the IEEE 802.11 standard.

Because the MU is able to receive announcement messages from other SAPs, these other SAPs are within communicating distance of the MU, and are therefore a potential candidate for the MU to communicate with. Finally, a request is transmitted to associate with the SAP that broadcast one of the announcement message (step 216). The announcement messages carry the identification of the SAP that sent the message, thus allowing the MU to determine which SAPs can be communicated with. This process, therefore, avoids sending probe messages and receiving probe response messages. Consequently, when an SAP fails, MUs can determine alternate SAPs to associate with, and not clog the wireless network with probe messages and probe responses.

Apparatus and methods consistent with the present invention may be used in any system that normally uses active probing, or similar measures, by the MUs when a connection is impeded. Moreover, the methods and apparatus disclosed herein could be used in association with standards other than IEEE 802.11.

While the invention has been described with reference to a specific embodiment, the description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A method of operating a data communications network including a plurality of access points operatively connected to a host computer and a plurality of remote mobile wireless units, at least one of the remote units located within communication range of at least two access points and normally associated with and in communication with one of said at least two access points, comprising:

(a) establishing communication and association between a first remote unit and a first access point;

(b) determining, in said first remote unit, that communication between the first remote unit and the first access point has been impeded;

(c) receiving in said first remote unit announcement messages broadcast over the airwaves, each message having an identification of particular ones of said remote units that have data messages waiting for transmission to said particular ones of said remote units;

(d) determining, in said first remote unit, the identity of the access point sending the announcement message; and (e) sending from a said remote unit a message including a request that said remote unit associate with the access point determined to be sending the announcement message.

2. A method of associating a remote mobile unit to a second access point when a connection between the remote unit and a first access point becomes impeded, comprising:

detecting when a connection between a remote unit and a first access point is impeded;

receiving at the remote unit an announcement message from a second access point, the announcement message containing undelivered message information;

determining identity information of the second access point based on the announcement message; and requesting association between the remote unit and the second access point using the identity information.

3. The method according to claim 2, wherein the step of determining identity information includes a substep of:

extracting the identity information from a source field of the announcement message.

4. The method according to claim 2, further including the step of:

receiving at the remote unit beacon messages having timing information for synchronizing access points.

5. An apparatus for associating a remote mobile unit to a second access point when a connection between the remote unit and a first access point becomes impeded, comprising:

means for detecting when a connection between a remote unit and a first access point is impeded;

means for receiving at the remote unit an announcement message from a second access point, the announcement message containing undelivered message information;

means for determining identity information of the second access point based on the announcement message; and means for requesting association between the remote unit and the second access point using the identity information.

6. The apparatus according to claim 5, wherein the means for determining identity information comprises:

means for extracting the identity information from a source field of the announcement message.

7. The apparatus according to claim 5, further comprising:

means for receiving at the remote unit beacon messages having timing information for synchronizing access points.

8. An apparatus for associating a remote mobile unit to a second access point when a connection between the remote unit and a first access point becomes impeded, comprising:

a detecting element for detecting when a connection between a remote unit and a first access point is impeded;

a receiver element for receiving at the remote unit an announcement message from a second access point, the announcement message containing undelivered message information;

an identity element for determining identity information of the second access point based on the announcement message; and an association requestor element for requesting association between the remote unit and the second access point using the identity information.

9. The apparatus according to claim 8, wherein the identity element comprises:

an extracting element for extracting the identity information from a source field of the announcement message.

10. The apparatus according to claim 8, further comprising:

a beacon message receiving element for receiving at the remote unit beacon messages having timing information for synchronizing access points.

11. The apparatus according to claim 8, wherein a host connects the first access point to the second access point.

12. The apparatus according to claim 8, wherein the remote unit comprises:

a handheld data-gathering unit.

13. The apparatus according to claim 8, wherein the detecting element comprises:

a lost connection detector for detecting that the connection has been lost.

14. The apparatus according to claim 8, wherein the detecting element comprises:

a connection detector for detecting a connection condition that would normally cause probing.

15. The method according to claim 1, wherein the step of determining the identity includes:

extracting the identity from a source field in said announcement message.

16. The method according to claim 1, wherein the remote unit comprises:

a handheld data-gathering unit.

17. The method according to claim 1, wherein the step of detecting that communication has been impeded includes:

detecting that the connection has been lost.

18. The method according to claim 1, wherein the step of detecting that communication has been impeded includes:

detecting a connection condition that would normally cause probing.

19. The method according to claim 2, wherein a host connects the first access point to the second access point.

20. The method according to claim 2, wherein the remote unit comprises:

a handheld data-gathering unit.

21. The method according to claim 2, wherein the step of detecting includes:

detecting that the connection has been lost.

22. The method according to claim 2, wherein the step of detecting includes:

detecting a connection condition that would normally cause probing.

23. The apparatus according to claim 5, further comprising:

a host for connecting the first access point to the second access point.

24. The apparatus according to claim 5, wherein the remote unit comprises:

a handheld data-gathering unit.

25. The apparatus according to claim 5, wherein the detecting element comprises:

a lost connection detector for detecting that the connection has been lost.

26. The apparatus according to claim 5, wherein the detecting element comprises:

a connection detector for detecting a connection condition that would normally cause probing.

* * * * *

UNITED STATES PATENT AND TRADEMARK OFFICE
CERTIFICATE OF CORRECTION

PATENT NO. : 6,188,681 B1
DATED : February 13, 2001
INVENTOR(S) : Sarosh N. Vesuna It is certified that error appears in the above-identified patent and that said Letters Patent is hereby corrected as shown below:

Claim 1, col. 4, line 57, "one of the remote units" should be --a first remote unit--;

line 61, "between a" should be --between said--.

Claim 2, col. 5, line 14, "a remote unit and a" should be --the remote unit and the --.

Claim 5, col. 5, line 34, "a remote: should be --the remote--.

line 35, "a first" should be --the first--.

Signed and Sealed this

Fifth Day of June, 2001

*Attest:*

*Attesting Officer*

NICHOLAS P. GODICI
*Acting Director of the United States Patent and Trademark Office*